United States Patent
Mihály et al.

(10) Patent No.: US 11,589,273 B2
(45) Date of Patent: Feb. 21, 2023

(54) CONTEXT PLACEMENT IN THE MOBILE COMMUNICATIONS NETWORK

(71) Applicant: Telefonaktiebolaget LM Ericsson (publ), Stockholm (SE)

(72) Inventors: Attila Mihály, Dunakeszi (HU); György Miklós, Pilisborosjenö (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 214 days.

(21) Appl. No.: 16/487,340

(22) PCT Filed: Feb. 24, 2017

(86) PCT No.: PCT/EP2017/054351
§ 371 (c)(1),
(2) Date: Aug. 20, 2019

(87) PCT Pub. No.: WO2018/153478
PCT Pub. Date: Aug. 30, 2018

(65) Prior Publication Data
US 2020/0068451 A1    Feb. 27, 2020

(51) Int. Cl.
*H04W 36/00*    (2009.01)
*H04W 76/12*    (2018.01)
*H04W 36/14*    (2009.01)

(52) U.S. Cl.
CPC ... *H04W 36/0033* (2013.01); *H04W 36/0016* (2013.01); *H04W 36/0022* (2013.01); *H04W 36/14* (2013.01); *H04W 76/12* (2018.02)

(58) Field of Classification Search
None
See application file for complete search history.

(56) References Cited

U.S. PATENT DOCUMENTS 7,050,793 B1    5/2006   Kenward et al.
11,140,601 B2 *  10/2021  Ke .................. H04W 68/00
(Continued)

FOREIGN PATENT DOCUMENTS

| EP | 2 239 977 A1 | 10/2010 |
| WO | 2014 008955 A1 | 1/2014 |
| WO | 2016 101974 A1 | 6/2016 |

OTHER PUBLICATIONS

Method for In-Band Meta-Data Transfer, The Industry Standard Disclosure Publication Service—Disclosed anonymously; Research Disclosure database No. 623051—Mar. 2016.

(Continued)

*Primary Examiner* — Jutai Kao
(74) *Attorney, Agent, or Firm* — Baker Botts, LLP

(57) ABSTRACT

The present invention relates to a method for operating a service application entity (100) configured to provide a service to a mobile entity (10) in a mobile communications network based on a client session, the method comprising: —determining a context information which comprises at least information required by another service application entity (400) providing the same type of service to continue the client session with the mobile entity, —pushing the context information towards a radio access node (300) of the mobile communications network to which the mobile entity is currently connected.

18 Claims, 7 Drawing Sheets

(56) References Cited

U.S. PATENT DOCUMENTS

| | | | | | |
|---|---|---|---|---|---|
| 2011/0294506 | A1* | 12/2011 | Claussen | ............... | H04W 8/10 455/435.1 |
| 2014/0086121 | A1* | 3/2014 | Emeott | ............... | G06F 9/445 370/311 |
| 2014/0219179 | A1* | 8/2014 | Zakrzewski | ............ | H04W 4/18 370/328 |
| 2014/0375686 | A1* | 12/2014 | Sakamoto | ............... | G06F 3/147 345/633 |
| 2015/0208305 | A1* | 7/2015 | Synnergren | ............ | H04W 4/20 455/436 |
| 2016/0182673 | A1* | 6/2016 | Kinarti | ................ | G06F 16/9574 709/219 |
| 2017/0118311 | A1* | 4/2017 | Frydman | ................. | H04L 67/42 |
| 2017/0168802 | A1* | 6/2017 | Quinlan | .................. | H04L 67/26 |

OTHER PUBLICATIONS

A Framework for Context-Aware Handover Decisions by Christian Prehofer et al.—2003 IEEE.

PCT International Search Report for International application No. PCT/EP2017/054351—dated Oct. 10, 2017.

Service Mobility in Mobile Networks by Hany Assasa; published in 2015 IEEE 8th International Conference on Cloud Computing—2015.

PCT Written Opinion of the International Searching Authority for International application No. PCT/EP2017/054351—dated Oct. 10, 2017.

3GPP TR 23.799 v1.0.2; Technical Report; 3rd Generation Partnership Project; Technical Specification Group Services and System Aspects; Study on Architecture for Next Generation System (Release 14)—Sep. 2016.

3GPP TS 23.401 v14.1.0; Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 14)—Sep. 2016.

3GPP TS 36.300 v14.0.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)—Sep. 2016.

* cited by examiner

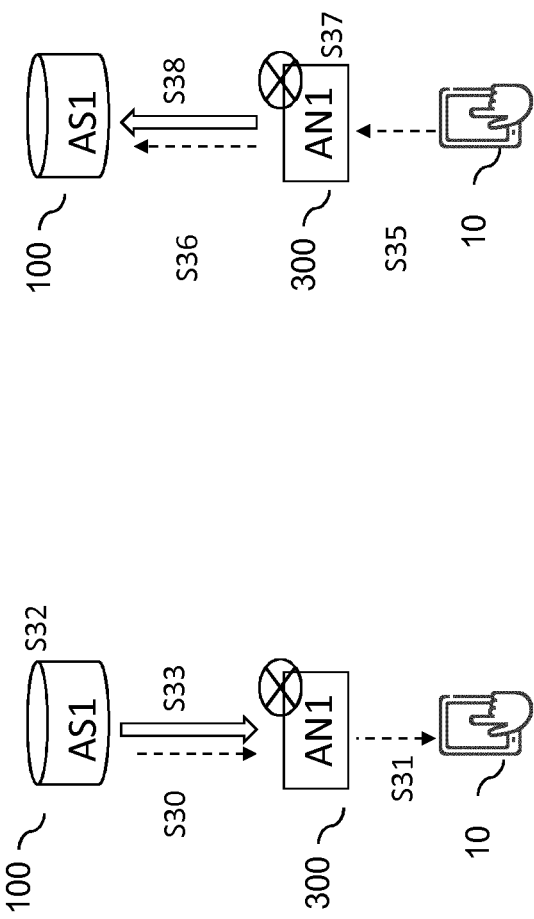

CONTEXT PLACEMENT IN THE MOBILE COMMUNICATIONS NETWORK

PRIORITY

This nonprovisional application is a U.S. National Stage Filing under 35 U.S.C. § 371 of International Patent Application Serial No, PCT/EP2017/054351 filed Feb. 24, 2017 and entitled "Context Placement in the Mobile Communications Network" which is hereby incorporated by reference in its entirety.

TECHNICAL FIELD

The present application relates to a method for operating a service application entity configured to provide a service to a mobile entity in a mobile communications network based on a client session and to the corresponding service application entity. Furthermore, a method for operating a second radio access node in the mobile communications network is provided and the second radio access node. In addition, a system comprising the service application entity and the radio access node is provided together with a computer program comprising program code and a carrier comprising the computer program.

BACKGROUND

In modern wide area mobile communication systems such as in a 3GPP LTE (Long Term Evolution)/EPC (Evolved Packet Core) networks or upcoming 5G systems, the mobility handling of mobile entities, also called User Equipments (UEs) connected to a radio access network (RAN) is network controlled (as disclosed in 3GPP TS 23.401 and 36.30. The UEs measure the radio link quality to the current Base Station (BS) as well as other candidate BSs, and send those measurement reports to the current BS. Based on these measurements, and a number of other factors such as the current load at the different BSs, the source BS may decide to trigger a handover procedure towards a target BS. The handover is first prepared towards the target BS using control signaling during which RAN-related UE context information needed to re-establish the UE connection to the target BS is transferred such as security keys, radio resource management parameters, bearer parameters. If the preparation of the handover is successful (meaning that the context has been successfully transferred to the target BS), the source BS commands the UE to perform the actual handover to the target BS.

The handovers in the modern mobile system have been optimized during the years in such a way that they provide a seamless user experience for the mobile entities in a mobile broadband service. However, new use cases are emerging for the mobile system beyond the most typical mobile broadband use case, such as critical machine type communication (C-MTC), where packets may need to be sent with very low latency and high reliability. In applications such as drone control, laser cutting, printing machines, haptic feedback etc., or any other machine control communication latency needs to be kept at no more than a few milliseconds, and packet loss needs to be avoided whenever possible. The new generation (5G) system architecture should thus support such use cases. This implies, however, that some application servers (AS) providing the applications mentioned above need to be deployed close to the clients. Operator provided local service clouds (LSC) provide one solution for this.

At handover, the closely placed AS controlling the application may need to be relocated to another closer AS to fulfil the delay requirement. Such a relocation involves AS context transfer including the state of the application as well as relevant states from the operating system such as the TCP states and buffers. The possibility for AS relocation is described e.g., in 3GPP, section 6.5.2 in TR 23.799 Version 14.0.0 which documents the studies around the 5G mobile system.

A concept for AS relocation is shown in the FIG. 1. When a first access node 50, (e.g., a BS) shown as AN1 in FIG. 1, the client with the mobile entity 10 is currently connected to determines, (e.g., based on measurements reported by the mobile entity), that a handover to a second access node 55, AN2 in FIG. 1, is needed (step S10), then access node 50 also indicates to the application server 60, AS1 in FIG. 1, handling the client session, to start the relocation to a new application server 65, AS2 in FIG. 1, in step S11. For this purpose, a control signaling mechanism is necessary between access node 50 and application server 60 (which may also use intermediary entities). In the case of AS relocation, the execution of the application is first suspended at application server 60, so that the data context can be transferred to application server 65 (step S12) where the execution is resumed after the relocation. The critical context transfer needed for AS relocation, i.e., step S12 may be executed
- as a separate process executed in parallel with the radio handover i.e., the two overlap in time;
- as a separate process executed before the radio handover;
- integrated with the mobility mechanisms of the cellular network. In this case, the AS context (needed to relocate the client session to application server 65) is transferred together with the client context (needed to re-establish the connectivity to access node 55).

The client/mobile entity 10 may resume communication with application server 65 after the handover. As the new application server 65 is located close to the client's new point of attachment to the network, the low communication delay can be kept after the handover: the communication delay between the mobile entity 10 and application server 65 is kept low, while the delay between the mobile entity and application server 60 may have been too large for the application to function properly.

EP 2 239 977 A1 discloses a method for supporting relocation of an IP session during a network layer handover in a mobile communication system.

As stated above, the critical context needed for the new application server 65 to continue the client session may be or may not be transferred as part of the existing mobility procedure. The main disadvantage of the latter is that additional signaling is required either between the application servers or between the application servers and the network infrastructure (e.g., LSCs) to transfer the states. This may be especially problematic for ping-pong handovers that may consume a lot of signaling and processing. Another related problem with the separate state transfers is that extensive topology knowledge (i.e., AN-AS relations) is needed in the source site (or AS) to directly access the proper target application server based on access mode information. Such a topology knowledge also complicates the local service offering. A work-around for this problem is to tunnel the context to the target access mode first that, in an IP anycast server addressing scheme, may forward the context uplink to be broken out at the corresponding server. However, in addition to introducing additional complexity, this solution, may also result in traffic tromboning, causing unnecessary delays and (up)link utilization. Because of the above problems, solutions with separate state transfer are less preferred.

If the states are to be transferred within the existing network procedures, then the context transfer trigger (Step S12 above) has to be sent before the handover (HO) process is started in order not to delay the handover process (i.e., in order that the context arrives by the time the handover process is due). Providing in advance network triggers needs additional network functionality to determine when to issue the trigger: if too early, then this increases the chance of unnecessary state transfers for unsuccessful HOs. These may be due to the volatility of radio handover process, i.e., failure cases where the client cannot attach to the new access node, but also due to changes in the radio conditions during the time between the trigger has been issued and the context arrived at the access mode. The result could be that AS relocation is started unnecessarily in case the first access node 50 eventually decides not to execute the handover, in which case the client can experience lack of service availability because of suspending the current AS. If, conversely, the context transfer trigger is sent too late, then the access mode will have to wait until the answer including the context arrives from the AS, and this delays the HO process, decreasing the service availability.

In the 5G system, it is expected that RAN will also support a so-called inactive connected state as mentioned in 3GPP TR 23.799 Version 14.0.0. Such a state will help the UE reduce its battery consumption, while the state transitions from connected state to and from this new inactive connective state will be optimized for low delay and low signaling load. During inactive connected state, the UE 10 may move without being controlled by the network. Hence, the UE may appear at a new location and may need to transition very quickly from inactive connected state to connected state. From the core network point of view, this may be similar to a handover procedure, with the difference that the UE 10 is already at the target location when such a procedure is started. It is very important to optimize the state transition for low delay. This may be problematic in case the AS needs to be relocated for the new location of the UE, as shown in FIG. 2. In step S15 the inactive client moves to the area of the second access node 55. When the client becomes active the second access node 55 requests the radio access network state from the access node 50 (step S16). As in step S11 the first access node triggers a context transfer in step S17 and in step S18 the context is finally transferred from the application server 60 to application server 65.

That is, the UE 10 is already at the target location, when the network gets notified about the need for AS relocation. This means, that AS relocation introduced an additional delay; e.g., if context is transferred with the existing procedure then the RAN context transfer has to wait for the states from AS. Hence, the current solution may not be sufficiently fast to be used in combination with the inactive connected state. Finally, for all different existing solutions variants, it is apparent that the application server need to perform a relatively complex functionality on receiving context transfer triggers, i.e., they should prepare a state to transfer, store that state, and/or send it to a receiving application server or network entity. The application server should also suspend processing or handle synchronization issues with the other AS taking over the session. Also note that this functionality in the application server should also have very good scaling properties to cope with bulk client mobility, where a large number of simultaneous state transfer requests may arrive instantly. It would be beneficial if the complexity above could be simplified.

Accordingly, a need exists to improve the transfer of context information when a handover from one access node to another access node takes place. There is a special need to perform the context transfer in such a way that a low latency can be guaranteed.

SUMMARY

This need is met by the features of the independent claims. In the dependent claims further embodiments are described.

According to a first aspect a method for operating a service application entity is provided which is configured to provide a service to a mobile entity in a mobile communications network based on a client session. According to one step a context information is determined which comprises at least information required by another service application entity providing the same type of service to continue the client session with the mobile entity. Furthermore, the context information is pushed to a radio access node of the mobile communications network to which the mobile entity is currently connected.

This push approach for the context transfer between the service application entity and the radio access node helps to improve the efficiency in case of a handover. Instead of requesting the application server context on demand by the network when there is a need for a transfer to another server application entity, also named application server hereinafter, the application server to which the client has an ongoing connection, places and pushes its context information, the critical context that is needed to continue with the client session, to the serving access node. In this way the context information becomes instantly available in the serving access node if the network reselects another access node for the client.

Furthermore, the corresponding service application entity is provided which comprises a memory and at least one processor wherein the memory contains instructions executable by at least one processor wherein the service application entity is operative to carry out the steps mentioned above and discussed in more detail below.

A second radio access node in a mobile communications network is provided to which the mobile entity is moving from a first radio access node. A service is currently provided to the mobile entity by a first service application entity based on a client session. When the second radio access node receives context information from the first radio access node which comprises the information required by the second service application entity providing the same type of service to continue the client session with the mobile entity, the second radio access node stores the received context information in the second radio access node and the received context information is also transmitted to the second service application entity. The sending of the context information to the second radio access node can be initiated by the first radio access node or by the second radio access node.

The application furthermore relates to the corresponding second radio access node which comprises a memory and at least one processor and wherein the memory contains instructions executable by the at least one processor and wherein the second radio access node is operative to carry out the steps mentioned above or discussed in more detail below.

As the context information was transferred to the first access node, it can be directly transferred to the second access node which can store the context information for further use and can transmit the context information to the second service application entity which will take over the control of the applied service.

Furthermore, a system is provided comprising the service application entity as discussed above and the second radio access node discussed above.

Additionally, a computer program comprising programme code to be executed by the at least one processor of the service application entity or of the radio access node are provided wherein execution of the program code causes the at least one processor to execute a method as discussed above or explained in more detail below. Additionally, a carrier comprising the program code is provided wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

FIG. 3 shows an example how the context information for a service applied by an application service is updated at a radio access node in order to obtain a handover with a low latency for an ongoing client session and how another radio access node the mobile entity changes to transmits the context information to another service application entity which will control the applied service when the mobile entity is connected to the other radio access node.

DETAILED DESCRIPTION OF EMBODIMENTS

Figure 2:
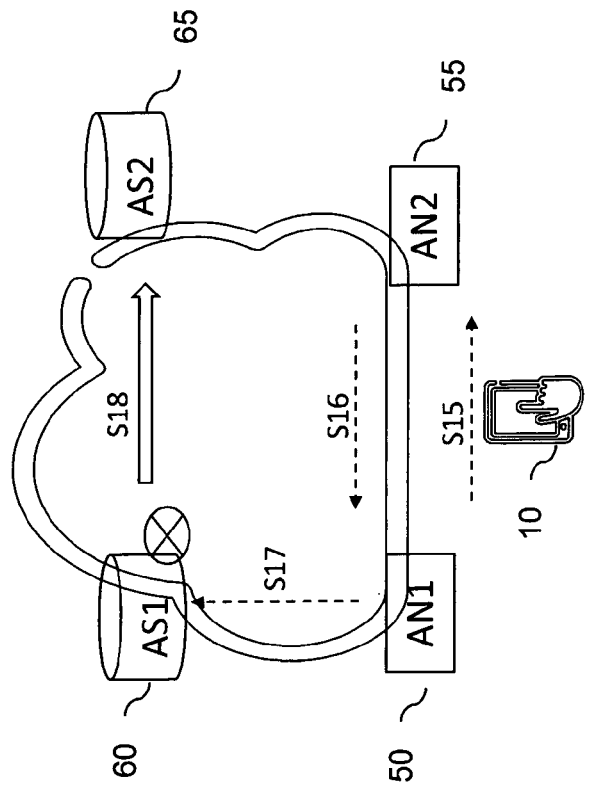
FIG. 2 shows a relocation of the application server known in the art in which a mobile entity transitions from a connected inactive state to an active state.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application, the term "mobile entity" or "user equipment" (UE) refers to a device for instance used by a person (i.e. a user) for his or her personal communication. It can be a telephone type of device, for example a telephone or a Session Initiating Protocol (SIP) or Voice over IP (VoIP) phone, cellular telephone, a mobile station, cordless phone, or a personal digital assistant type of device like laptop, notebook, notepad, tablet equipped with a wireless data connection. The UE may also be associated with non-humans like animals, plants, or machines. A UE may be equipped with a SIM (Subscriber Identity Module) or electronic-SIM comprising unique identities such as IMSI (International Mobile Subscriber Identity), TMSI (Temporary Mobile Subscriber Identity), or GUTI (Globally Unique Temporary UE Identity) associated with the user using the UE. The presence of a SIM within a UE customizes the UE uniquely with a subscription of the user.

For the sake of clarity, it is noted that there is a difference but also a tight connection between a user and a subscriber. A user gets access to a network by acquiring a subscription to the network and by that becomes a subscriber within the network. The network then recognizes the subscriber (e.g. by IMSI, TMSI or GUTI or the like) and uses the associated subscription to identify related subscriber data. A user is the actual user of the UE, and the user may also be the one owning the subscription, but the user and the owner of the subscription may also be different.

In the following a push approach for optimising the relocation of an application server is disclosed wherein context information is pushed from the application server to the access node. The context information includes the information needed by another service application entity providing the same kind of service to continue an ongoing client session with the mobile entity. The client session can be session of a critical machine type communications (C-MTC)

which are used for controlling machines or which provide haptic feedback. The context information can contain information of the client-related state or client session related state, wherein an example of the context information relates to the state of the client application including security credentials, last received message sequence number, previously received client positioning and mobility status, sensor information. The context information may furthermore comprise relevant states from the operating system which is related to the application such as TCP states and buffers.

In the following an exchange of the context information is discussed. Some interactions proposed in this context are shown in FIG. 3.

The left part of the figure shows a mobile entity 10 which is connected to a radio access node 300 wherein a client session is going on which is controlled by application server 100. In a first step S30 server data of the application server are transmitted to the radio access node and in step S31 the server data of the application server are further transmitted to the mobile entity 10. In step S32 the application server decides to push the context information to the radio access node 300. The push decision in step S32 may often relate to sending new server data such as a control command to the client, because this changes in general the corresponding context in the application server. As a result the radio access node is aware of the context information. In general, a new context push can be carried out every time the context changes in the AS. The burden of data transfer may be then reduced by transferring only the relevant parts of the context, as described in further detail below.

In the right part of FIG. 3 an exemplary transfer of context information from the radio access node 300 to the application server 100 as shown. The transfer can take place when the mobile entity changes the radio access node. In step S35 the client data are transmitted from the mobile entity 10 to the radio access node 300, and in step S36 the client data are transmitted from the radio access node 300 to the application server 100. The radio access node 300 may take a transfer decision step S37 to transfer the context information to the application server. This transfer decision may occur when a first packet is sent from the client that has recently moved to the radio access node 300. Different other triggers for transferring the context of the possible and will be discussed in more detail below.

Different signaling methods may be used for transferring the context information:
  On-path signaling between the AS 100 and AN 300 using the same five-tuple as the client-AS session. The message is prepared in such a way that it will be ignored or dropped if received by the client.
  On-path signaling using tunneling header information to distinguish signaling information from user data.
  A separate user plane protocol defined for AN-AS communication.
  Off-path signaling through control plane entities, (potentially involving both network controllers and AS controllers).

Regarding the structure of the transferred context information, it may comprise two parts:
  The context itself. The context is informative to the application server only, thus it may be encrypted using keys that may be deciphered only by application servers but not the radio access nodes, providing thus a secure solution for context transfer.
  Additional meta-information dedicated to the application server 100 or radio access node 300, respectively. This may include information related to the context and/or to its transfer, e.g., its type, its 'warranty' (a time interval, or when new context update is received) or specific request for a certain context. When sent from the AS, the latter could e.g., be seen as a 'network storage' type of solution to increase reliability. The ANs 300 may send such a request e.g., when there has been an inter-RAT (Radio Access Technology) HO with no radio context transfer and the target application server needs to retrieve the actual context information to further providing the support for AS relocation. Note that sending meta-information is especially useful for instructing the AN transfer decision logic for when to start a handover process. For example, there could be periods, (e.g., controlling a moving robotic arm in the middle of its trajectory) when the period between sub-sequent control commands from the server increases. If receiving such information, the radio access nodes may decide to execute the handovers in these periods, reducing in this way the chance that a server communication occurs in the stage when the handover process is executing, thus reducing the chance of service degradation. This is an inherent advantage of this method, i.e., no additional interfaces to the application servers are needed, which is an advantage of the method compared to systems known in the art. Further advantage of sending meta-information to the ANs are detailed below.

It is possible that instead of the full context information, only parts of context are transferred and different triggers are possible for the different type of context that should be transferred. The advantage of such a solution is to keep the required information that needs to be transferred through either of the AS-AN or AN-AN relations at a minimal level. These different triggers may be e.g., inferred by the transfer decision based on different meta-information sent with the context, as described above. Examples of triggers and context types are:
  Each data packet from the AS 100 generates a few bytes of context that replaces the corresponding part of the context in the AN 300.
  Some part of the context is sent from the AS 100 regularly or irregularly, indicating e.g., a 'time-to-live' period in its meta-information or a previous message "ID" it obsoletes. This type of context would contain information that is more robust to short-time changes, e.g., some application layer information, like the current velocity of the client.
  An example when storing such information separately in the ANs 300 is beneficial is the ping-pong effects: if the source AN 300 stores the context before the HO, then in the case of reverse HO only those parts of the context need to be transferred that have been changed compared to what has been previously received, i.e., context with a valid 'time-to-live' does not need to be transferred back.
  Some context is sent only on specific requests (as mentioned above)

The concept discussed in connection with FIG. 3 may be generalized to a case when there is an intermediate entity between the AS and the AN, e.g., an LSC infrastructure that mediates the interaction. In this case, it is the LSC that receives the state from the AS and then provides it to the AN, when needed. Likewise, it is also possible that the LSC directly provides the context to the new application server in an AN agnostic way. An example realization for this scenario is the following: At the beginning, LSC stores context information of a first application server in a place close to AS1. At handover preparation phase the first radio access node sends a trigger to LSC based on which LSC transfers the stored context of the first application server to a place close to the second application server in a way that is transparent both to first application server and the first access node. After client HO, the second application server may thus retrieve the client context from this close location (edge cloud) using a generic API (Application Programming Interface) to this LSC.

Figure 4:
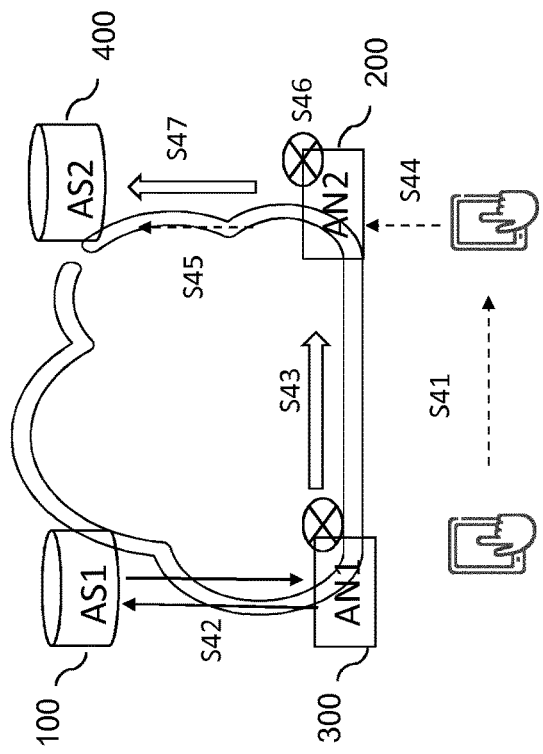
FIG. 4 shows an example schematic message flow of a relocation of a context information during handover with one active application server at a time.

In connection with FIG. 4 a context transfer during handover is described with one active application server 100 and a stand-by application server 400.

The stand-by application server 400 is provided at the target site, i.e., a pre-installed AS that has all necessary ingredients to take the control of the client (algorithms, etc.) except the context information. Such a server can be set up prior to the HO procedure based on network indications to the service provider when such a HO becomes imminent.

The example in this section assumes that one AS is active at a time, i.e., the execution of the application is first suspended at application server 100, so that the data context can be transferred to application server 400, where the execution is resumed after the relocation. The advantage of this alternative is that there cannot be synchronization issues during AS relocation.

The different steps are discussed below:

S41: A HO decision is made in AN1 300 (that this may relate to observed AS1 traffic characteristics, to diminish potential service degradation during handovers by finding a proper time for HO)

Figure 1:
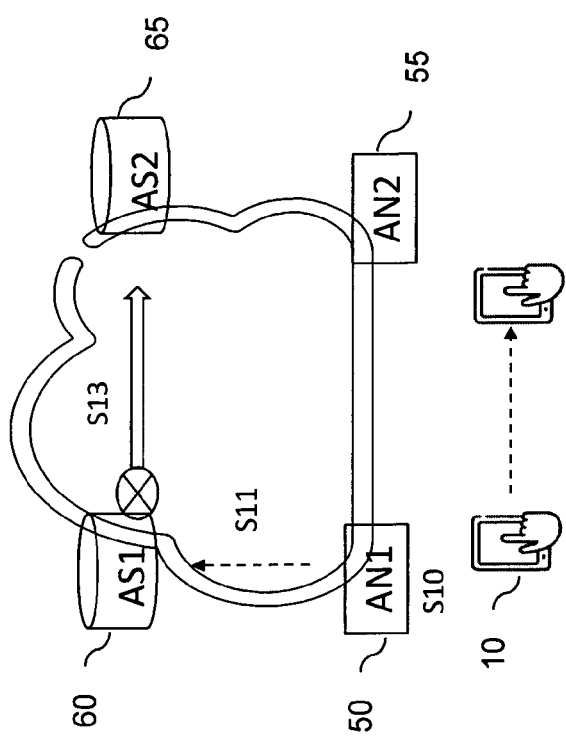
FIG. 1 shows a schematic message exchange for the relocation of an application server known in the art in case of a handover.

S42: AN1 300 sends a request to AS1 100 to suspend communication. After this has been completed, an Ack is sent back from AS1 100, potentially together with a (partial) context update if needed. Compared with the context request/reply step in state-of art method depicted in FIG. 1 this should be a faster procedure due to the fact that a copy of the necessary context data is already stored in AN1 300. It is also possible that the AN1 300 does not need to wait for an Ack from the AS1 100, but goes on with the handover in parallel. This is possible in case the AS1 100 continuously updates the context in the AN1 300. However, in that case there could be some sync issues (last-minute AS context change might not be reflected in the AN1) which would need to be handled at application level if necessary.

S43: The HO process takes place between AN1 300 and AN2 200 together with context information transfer (that may be part of HO preparation process). The context information transfer may include an indication of the destination server identity the context refers to. For example, in the case of anycast server addressing, this may be the anycast IP address of as that is known by AN1 300.

S44: After the client HO is executed, the client sends data through the AN2 200.

S45: AN2 200 forwards traffic from the client but also triggers the decision logic.

S46: The decision logic decides to transfer the stored context to AS2 400 wherein the trigger in this case is the first packet from the client 10. Alternatively, the decision may be triggered already by the HO process, i.e., without waiting until the first client data packet arrives to AN2 200. This has the advantage that it lets the server prepare in advance for client data.

S47: The critical context is forwarded to AS2 400, possibly based on the indication of the server identity for the context received from AN1 300, and the session is resumed at AS2 400.

In the further step not shown, the context at AN1 300 is released, triggered e.g., by a timer expiry that was started upon an indication from AN2 200 of a successful handover; AN1 300 could also send a trigger to AS1 100 to remove any remaining context for this session. The timer based method also helps to avoid frequent context setup and release at ping pong handovers.

Figure 5:
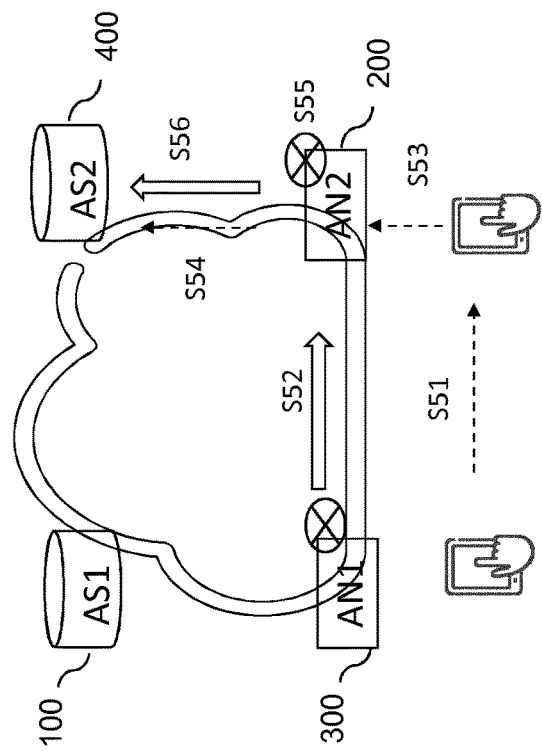
FIG. 5 shows an example schematic message flow of a relocation of context information during handover with two active application servers.

In the following an example will be discussed in connection with FIG. 5 where two active application servers are used. The steps shown in FIG. 5 are as follows:

S51: A HO decision for the client is made in the access node AN1 300.

S52: The critical context in the AN1 300 for the given client session is transferred to AN2 200, potentially as part of HO preparation signaling. Unlike the case with single active AS, there is no communication with the local AS1 100 beforehand.

S53: Client HO is executed, and the client sends data through AN2 200.

S54: AN2 200 forwards traffic from the client but also triggers the decision logic.

S55: The transfer decision logic in AN2 200 performs a data verification, e.g., it checks whether the sequence number in the client packet is the same as the one on the stored context. This step may be helpful because the AS1 100 could potentially further communicate with the client during the context transfer which could cause a context change compared to what has been transferred. There could be other reasons for context change besides UE communication. But here it is assumed that such other events are not time-critical compared to UE communication, and other application level or transport level mechanisms handle context change at AS relocation due to other events. Different parts of the context could have different sequence numbers, which is useful when different parts are updated differently in the ANs, as discussed above.

If the verification concludes that the context has changed during the HO process, then a new (partial) context transfer may be issued wherein this step is not shown in the figure. The synchronization is handled much more easily between the time-synchronized ANs than between the application servers, which is a further advantage of the proposed method.

S56: The decision logic decides to transfer the stored context to AS2 400.

In a last step not shown in the FIG. 5, the context at AN1 300 can be released, possibly after a timeout period, and, based on a notification of access node AN1 300, also any remaining context at AS1 100. The release can be based on an explicit indication from AN2 200 that the UE 10 has arrived to AN2 200.

In FIGS. 4 and 5 the context transmission is indicated by the first radio access mode. Furthermore, it is also possible that the second access node requests the context information when it is aware of the fact that a handover with an ongoing client session is taking place. One typical case is when the client/mobile entity has been inactive and becomes active at the second access node as discussed in connection with FIG. 6 below. In this case, there is no handover procedure (the client simply became idle at the first access node from which point it has not been reachable by the network so the first time the network knows about the client whereabouts is when it issues a service request at the second access node.

As indicated above it is possible that the second access node request the context information. In connection with FIG. 6 a method is discussed which can be used to speed up the AS relocation in case the client undergoes a connected inactive-active state transition.

S61: The client has been inactive while connected via AN1 300 to the network so the system puts it in connected inactive-active state and stores the RAN states in AN1 300. Meanwhile the client moves to the coverage of AN2 200.

S62: The client needs to transfer data and requests a network service.

S63: Radio access node AN2 200 requests the RAN states from radio access node AN1 300.

S64: AN1 300 has also stored the critical context received from AS1 100 since the client was last active. So AN1 300 also transfers this context potentially using the same network signaling as for transferring the RAN state.

S65: The received context triggers the decision logic in AN2 200 that decides to transfer the stored context to AS2 400. The critical context is forwarded to AS2 400, the session is resumed at AS2 400

S66: The client sends data through AN2 200.

S67: AN2 200 forwards traffic from the client to AS2.

The example above assumes two active application servers. There cannot be synchronization problems in this case as the client has been inactive before it moved to AN2 200 so no freeze of application server AS1 100 is necessary before the transfer, assuming that context changes occur only as a result of UE activity.

Figure 7:
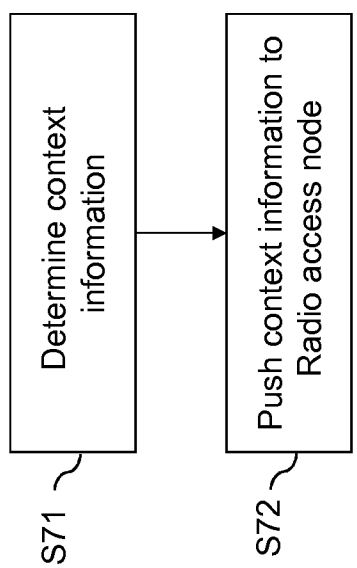
FIG. 7 shows an example schematic flow chart comprising the steps carried out by an application server pushing context information to the access node.

FIG. 7 summarises the steps carried out by the service application entity such as the service application entity 100 shown in the figures above. According to a first step S71 the service application entity determines a context information, namely the information required by the service application entity taking over the control of the provided service, to continue the client session with the mobile entity. In step S71 it is assumed that a client session is going on with the service application entity 100. In step S72 the context information is pushed to a radio access node to which the mobile entity is currently connected. Accordingly, the server places the context information needed to handle the ongoing client session in the access node.

Figure 6:
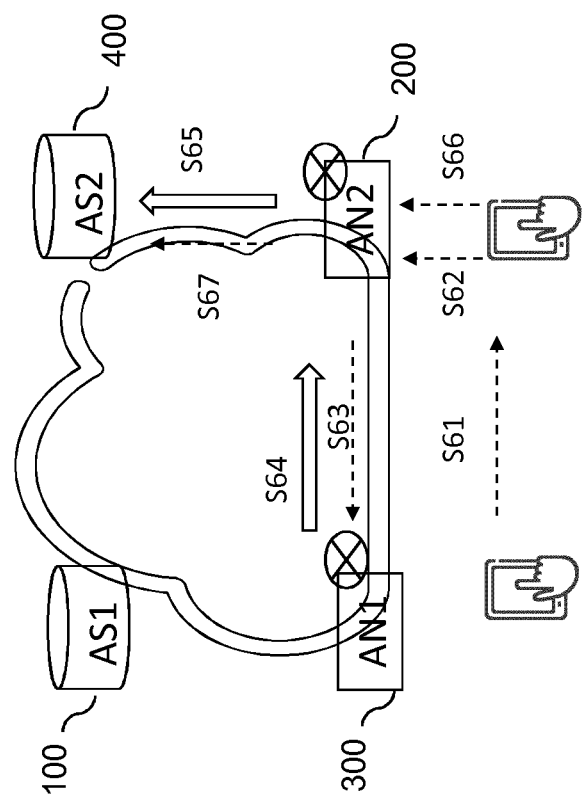
FIG. 6 shows an example schematic message flow of a relocation of context information when a mobile transitions from an inactive to active state.
Figure 8:
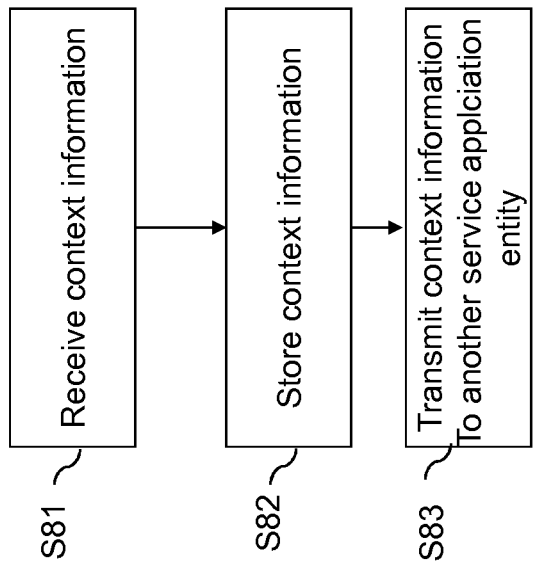
FIG. 8 shows an example schematic flow chart comprising the steps carried out by a new access node taking over the mobile entity after the handover.

FIG. 8 summarises the steps carried out in the second radio access node, such as access mode 200 shown in FIGS. 4 to 6, which takes over the control of the mobile entity 10 after the handover. In step S 81 context information is received from the first radio access node 300 to which the context was pushed from the first application server 100. In step S 82 the context is stored in the second radio access node 200 so that the context is present in the second radio access node 200. Furthermore, the context information is transmitted to the other application server which will take over the client session. The transmission can be based on a trigger signal or trigger event. The trigger can be a completion of the handover, when a first data packet for the server is received from the mobile entity 10, a server request from a previously inactive client.

Figure 9:
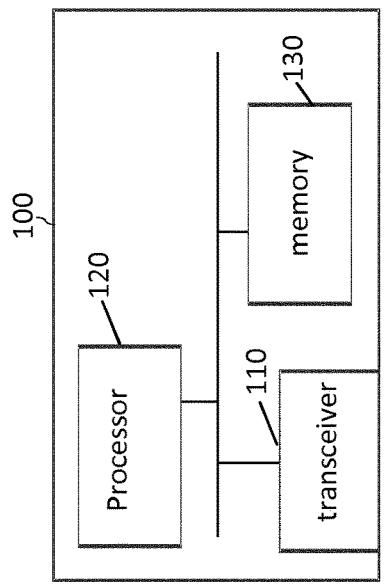
FIG. 9 shows an example schematic representation of an application server pushing the context information to the access node.

FIG. 9 shows a schematic architectural view of an application server 100 which can carry out the above discussed pushing of the context information. The application server comprises an interface 110 which is provided for transmitting user data or control messages to other entities via a transmitter and to receive user data and control messages from other entities using a receiver. The interface 110 is especially qualified to push context information to the radio access node. The application server furthermore comprises a processor 120 which is responsible for the operation of the entity 100. The processor 120 comprises one or more processing units and can carry out instructions stored on a memory 130, wherein the memory may include a read-only memory, a random access memory, a mass storage, a hard disk or the like. The memory can furthermore include suitable program code to be executed by the processor 120 so as to implement the above described functionalities in which the application server 100 is involved.

Figure 10:
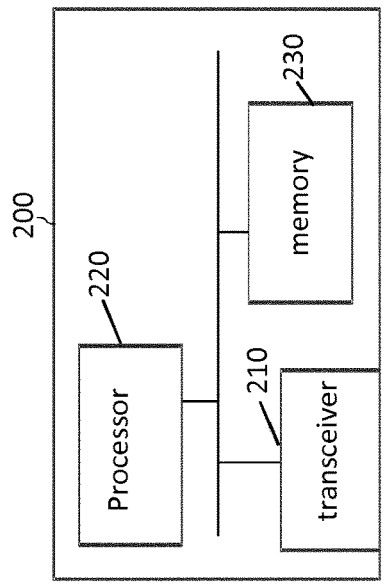
FIG. 10 shows an example schematic representation of a radio access node receiving the context information from another radio access node in case of a handover.

FIG. 10 shows a schematic architectural view of the second radio access node 200 which can receive the context information from the first radio access node 300. The radio access node 200 comprises an interface 210 which is provided for transmitting user data or control messages to other entities via a transmitter and to receive user data and control messages from other entities using a receiver. The interface 210 is especially qualified to receive the context information and to forward it to the second application server 400. The radio access node 200 furthermore comprises a processor 220 which is responsible for the operation of the radio access node 200. The processor 220 comprises one or more processing units and can carry out instructions stored on a memory 230, wherein the memory may include a read-only memory, a random access memory, a mass storage, a hard disk or the like. The memory can furthermore include suitable program code to be executed by the processor 220 so as to implement the above described functionalities in which the radio access node 200 is involved.

Figure 11:
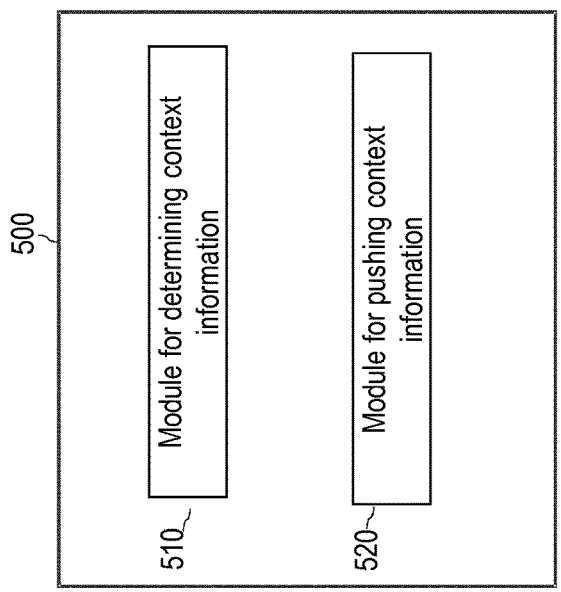
FIG. 11 shows in another example schematic representation of an application server pushing the context information to the access node.

FIG. 11 shows a further example of the first application server 500 which pushes the context information to the first radio access node. The application server 500 comprises a module 510 for determining the context information that is needed by the other application server for taking over the client session. Furthermore, a module 520 is provided which is responsible for pushing the context information to the first radio access node so that the latter can store and is always provided with the most recent context information.

Figure 12:
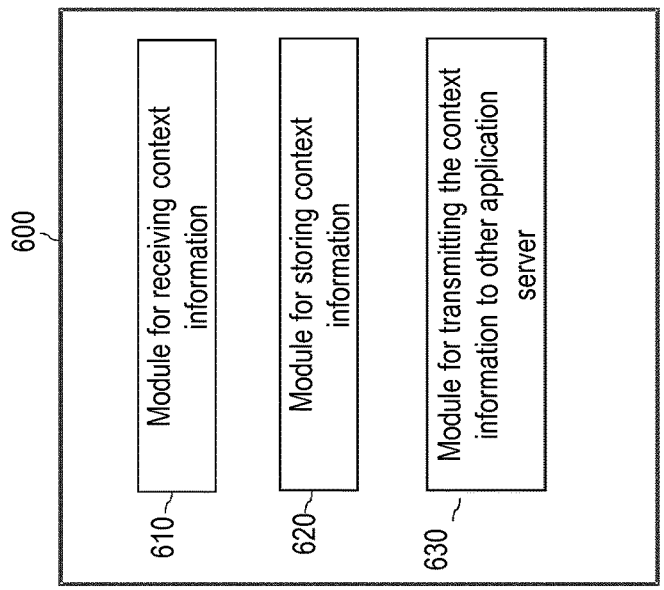
FIG. 12 shows another example schematic representation of the radio access node receiving context information from another radio access node in case of a handover.

FIG. 12 shows a further example of the second radio access node 600 which receives the context information from the first access node. The second access node 600 comprises a module 610 for receiving the context information. The second access node furthermore comprises a module 620 for storing the context information as received. Additionally, a module 630 is provided for transmitting the context information to the other application server.

Summarizing, a method is provided which helps at application server relocation, where the servers place at least one context element needed to handle an on-going client session in the access nodes.

The source or first access nodes transfer the stored context information to the new or second access nodes the clients re-attach to during client mobility and the new access nodes forward the context to the new or second application servers.

The first or source access node may temporarily keep the context that it transfers to handle clients returning back due to e.g., ping-pong handovers or handover failures.

It is possible that the client/mobile entity re-connects to a new access node which has been previously active (i.e., there was user plane connectivity for the given client at the sources access when the relocation is triggered) or idle, respectively. The transfer may utilize the existing network procedures to handle active or inactive client mobility.

As far as the service application entity pushing the context information is concerned, the context information may be pushed to the radio access node whenever the context information is changed at the service application entity.

The context information may be pushed to the radio access node using an on-path signaling with a 5-tuple used in the client session. As an alternative the context information may be pushed to the radio access node using header information of a tunnel provided between the service application entity and the radio access node.

When context information is determined it is possible to determine the essential information required by the other service application entity providing the same type of service to continue the client session with mobile entity wherein furthermore non-essential information is determined providing non-essential information related to the service. This non-essential information can contain information related to the transfer of the context information to the radio access node wherein the determined information is encoded into the context information. The non-essential information can furthermore comprise an occurring frequency of control commands related to the provided service wherein an indication of the occurring frequency is encoded into the context information.

Furthermore, it is possible to determine whether data present in the context information has changed and only the data that has changed is pushed to the radio access node. As discussed above this helps to minimize a possible ping-pong in case of several handovers between a first and a second access node.

The non-essential information can furthermore comprise an expiration date for a part of the context information wherein the expiration date is encoded for the part of the context information to which it refers into the context information. The non-essential information can furthermore contain an identification of one part of the context information that will replace a corresponding part of a formerly active context information wherein this identification is encoded into the context information.

The context information may be pushed to the radio access node in several separate messages, wherein each message only comprises a part of the context information.

As far as the second radio access node is concerned to which the mobile entity has been handed over, the received context information can comprise an indication allowing the second service application entity to be determined and the second radio access node identifies the second service application entity taking over the client session based on the indication.

The received context information can be transmitted to the second application server based on a trigger signal generated at the second access node. By way of example the trigger signal may be generated when it is determined that a handover from the first radio access node is completed. Furthermore, the trigger signal may be generated when an arrival of a first data packet of the client session from the mobile entity is detected or when a service request is received from the mobile entity. This last example mainly occurs when the mobile entity moves in an inactive state to another radio access node as mentioned above in connection with FIG. 6.

The second radio access node may receive a data packet of the client session, e.g. from the first access node, and the second radio access node can check whether the packet number of the received data packet is the same as a packet number stored in the context information at the second radio access node. If this is not the case an updated context information is transmitted to the second service application entity.

The solution allows for AS context transfer within existing network procedures, providing its advantages relative to separate context transfer. It provides the following advantages:
a reduced signaling when the existing network procedures related to client mobility are used,
the on-path transfer of context may simplify finding the new application server for an anycast server addressing scheme.

The application provides an improved performance compared to current methods:
an increased service availability is provided, because of
Reduced context transfer delay: There is an application server context available instantly in the radio access nodes that may be transferred to a new application server (through the new AN) if needed,
There is the capability to choose a proper time for handover execution based on context meta-information provided by the application server (e.g., time-to-live),
The handling scenarios where the client returns to the source access node, are improved by temporarily keeping the context at the source access node.
this reduces the overhead with ping-pong effects: only the context changed since last time has to be transferred, and
handover failure scenarios may also be handled in this way.
Finally it enables fast connected inactive-active state transition.
A simplified context transfer management is provided on the side of the application server:
Unified method for context handling is provided,
There is a tunable set of what to transfer from the context information,
No scaling issue exists for bulk handovers, and
Synchronization between two active AS is not needed.
It should be noted that synchronization may be handled much more easily between the time-synchronized access nodes than between the application servers.

The invention claimed is:

1. A method for operating a service application entity configured to provide a service to a mobile entity in a mobile communications network based on a client session, the method comprising:
determining a context information which comprises at least information requested by another service application entity providing the same type of service to continue the client session with the mobile entity,
pushing the context information towards a radio access node of the mobile communications network to which the mobile entity is currently connected,
wherein the context information is pushed to the radio access node using an off-path signaling through control plane entities comprising a network controller and/or an application server controller,
wherein the context information is pushed to the radio access node in several separate messages, each message comprising only a part of the context information.

2. The method according to claim 1, wherein the context information is pushed to the radio access node whenever the context information is changed at the service application entity.

3. The method according to claim 1, wherein the context information is further pushed to the radio access node using an on-path signaling with a 5 tuple used in the client session.

4. The method according to claim 1, wherein the context information is pushed to the radio access node using header information of a tunnel provided between the service application entity and the radio access node.

5. The method according to claim 1, wherein determining context information comprises determining essential information required by the other service application entity providing the same type of service to continue the client session with the mobile entity and determining non-essential information providing non-essential information related to service.

6. The method according to claim 5, wherein determining non-essential information comprises determining information related to a transfer of the context information to the radio access node, wherein the determined information is encoded into the context information.

7. The method according to claim 5, wherein determining non-essential information comprises determining an occurring frequency of control commands related to the provided service, wherein an indication of the occurring frequency is encoded into the context information.

8. The method according to claim 1, wherein it is determined whether data present of the context information has changed, wherein only the data that has changed is pushed to the radio access node.

9. A service application entity configured to provide a service to a mobile entity in a mobile communications network based on a client session, wherein the entity is operative to:
determine a context information which comprises at least information requested by another service application entity providing the same type of service to continue the client session with the mobile entity,
push the context information towards a radio access node of the mobile communications network to which the mobile entity is currently connected,
wherein the context information is pushed to the radio access node using an off-path signaling through control plane entities comprising a network controller and/or an application server controller,
push the context information to the radio access node in several separate messages, each message comprising only a part of the context information.

10. The service application entity according to claim 9, further being operative to push the context information to the radio access node whenever the context information is changed at the service application entity.

11. The service application entity according to claim 9, further being operative to push the context information to the radio access node using an on-path signaling with a 5 tuple used in the client session.

12. The service application entity according to claim 9, further being operative to push the context information to the radio access node using header information of a tunnel provided between the service application entity and the radio access node.

13. The service application entity according to claim 9, further being operative, for determining context information, to determine essential information required by the other service application entity providing the same type of service to continue the client session with the mobile entity and to determine non-essential information providing non-essential information related to service.

14. The service application entity according to claim 13, further being operative, for determining the non-essential information, to determine information related to a transfer of the context information to the radio access node, and to encode the determined information into the context information.

15. The service application entity according to claim 13, further being operative, for determining the non-essential information, to determine an occurring frequency of control commands related to the provided service, and to encode an indication of the occurring frequency into the context information.

16. The service application entity according to claim 13, further being operative, for determining the non-essential information, to determine an expiration date for a part of the context information, and to encode the expiration date for the part of the context information into the context information.

17. The service application entity according to claim 13, further being operative, for determining the non-essential information, to determine an identification for one part of the context information that will replace a corresponding part of a formerly active context information, and to encode the identification into the context information.

18. The service application entity according to claim 9, further being operative, to determine whether data present of the context information has changed, and to push only the data that has changed to the radio access node.

\* \* \* \* \*